US011418125B2

(12) United States Patent
Yenduri et al.

(10) Patent No.: US 11,418,125 B2
(45) Date of Patent: Aug. 16, 2022

(54) THREE PHASE BIDIRECTIONAL AC-DC CONVERTER WITH BIPOLAR VOLTAGE FED RESONANT STAGES

(71) Applicant: The Research Foundation for The State University of New York, Binghamton, NY (US)

(72) Inventors: Kalyan Yenduri, Vestal, NY (US); Sunil Dube, Vestal, NY (US); Pritam Das, Vestal, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 43 days.

(21) Appl. No.: 17/079,396

(22) Filed: Oct. 23, 2020

(65) Prior Publication Data

US 2021/0126550 A1 Apr. 29, 2021

Related U.S. Application Data

(60) Provisional application No. 62/926,206, filed on Oct. 25, 2019.

(51) Int. Cl.
*H02M 5/458* (2006.01)
*H02M 7/797* (2006.01)
(Continued)

(52) U.S. Cl.
CPC ......... *H02M 5/4585* (2013.01); *H02M 7/797* (2013.01); *H02M 1/007* (2021.05);
(Continued)

(58) Field of Classification Search
CPC ... B60L 53/20; B60L 55/00; H02J 7/02; H02J 7/06; H02J 2007/10; H02M 1/0058;
(Continued)

(56) References Cited

U.S. PATENT DOCUMENTS 5,418,704 A 5/1995 Hua et al.
5,754,419 A 5/1998 Ho
(Continued)

OTHER PUBLICATIONS

U.S. Appl. No. 10/015,848, filed Jul. 3, 2018, Fang et al.
(Continued)

*Primary Examiner* — Fred E Finch, III
(74) *Attorney, Agent, or Firm* — Hoffberrg & Associates; Steven M. Hoffberg (57) ABSTRACT

A bidirectional AC power converter, having a front-end comprising parallel sets of three switches in series, which connects multi-phase AC to coupling transformer through a first set of tank circuits, for synchronously bidirectionally converting electrical power between the multi-phase AC and a DC potential, and for converting electrical power between the DC potential to a bipolar electrical signal at a switching frequency, controlled such that two of each parallel set of three switches in series are soft-switched and the other switch is semi-soft switched; the coupling transformer being configured to pass the bipolar electrical power at the switching frequency through a second set of the tank circuits to a synchronous converter, which in turn transfers the electrical power to a secondary system at a frequency different from the switching frequency.

20 Claims, 5 Drawing Sheets

(51) Int. Cl.
*H02M 7/48* (2007.01)
*H02M 1/00* (2006.01)
*H02M 1/42* (2007.01)
*H02M 1/36* (2007.01)

(52) U.S. Cl.
CPC ............ *H02M 1/0058* (2021.05); *H02M 1/36* (2013.01); *H02M 1/425* (2013.01); *H02M 7/4807* (2013.01)

(58) Field of Classification Search
CPC ........ H02M 1/007; H02M 1/36; H02M 1/425; H02M 5/225; H02M 5/293; H02M 5/4585; H02M 7/4807; H02M 7/797
See application file for complete search history.

(56) References Cited

U.S. PATENT DOCUMENTS

| | | | |
|---|---|---|---|
| 5,786,992 A | 7/1998 | Vinciarelli et al. | |
| 5,907,223 A | 5/1999 | Gu et al. | |
| 5,920,471 A | 7/1999 | Rajagopalan et al. | |
| 5,952,812 A * | 9/1999 | Maeda | H02M 7/217 318/803 |
| 6,115,267 A | 9/2000 | Herbert | |
| 6,128,205 A | 10/2000 | Bernd et al. | |
| 6,272,025 B1 | 8/2001 | Riggio et al. | |
| 6,330,170 B1 * | 12/2001 | Wang | H02M 7/797 363/37 |
| 6,344,986 B1 | 2/2002 | Jain et al. | |
| 6,424,548 B2 | 7/2002 | Pascu et al. | |
| 6,493,242 B1 | 12/2002 | Riggio et al. | |
| 6,504,423 B2 | 1/2003 | Riggio et al. | |
| 6,507,501 B2 | 1/2003 | Riggio et al. | |
| 6,519,164 B1 | 2/2003 | Weng et al. | |
| 6,545,431 B2 | 4/2003 | Hui et al. | |
| 6,567,281 B2 | 5/2003 | Riggio et al. | |
| 6,567,283 B2 | 5/2003 | Welches | |
| 6,580,259 B2 | 6/2003 | Liu et al. | |
| 6,594,158 B2 | 7/2003 | Batarseh et al. | |
| 6,714,429 B2 | 3/2004 | Phadke | |
| 6,728,121 B2 | 4/2004 | Ben-Yaakov et al. | |
| 6,738,274 B2 | 5/2004 | Prasad et al. | |
| 6,788,557 B2 | 9/2004 | Phadke | |
| 6,812,679 B2 | 11/2004 | Liu et al. | |
| 6,952,355 B2 | 10/2005 | Riggio et al. | |
| 6,970,364 B2 | 11/2005 | Batarseh et al. | |
| 6,987,676 B2 | 1/2006 | Cheng et al. | |
| 7,061,189 B2 | 6/2006 | Newman, Jr. et al. | |
| 7,085,145 B2 | 8/2006 | Sheehy et al. | |
| 7,148,660 B2 | 12/2006 | Ghosh et al. | |
| 7,148,669 B2 | 12/2006 | Maksimovic et al. | |
| 7,157,886 B2 | 1/2007 | Agarwal et al. | |
| 7,161,816 B2 | 1/2007 | Shteynberg et al. | |
| 7,164,589 B1 | 1/2007 | Soldano et al. | |
| 7,274,112 B2 | 9/2007 | Hjort et al. | |
| 7,291,987 B2 | 11/2007 | Chang et al. | |
| 7,317,625 B2 | 1/2008 | Zhang et al. | |
| 7,453,248 B2 | 11/2008 | Takeuchi | |
| 7,456,518 B2 | 11/2008 | Hjort et al. | |
| 7,471,527 B2 | 12/2008 | Chen | |
| 7,493,502 B2 | 2/2009 | Hsieh | |
| 7,514,913 B2 | 4/2009 | Zhang et al. | |
| 7,535,205 B2 | 5/2009 | Popescu et al. | |
| 7,564,706 B1 | 7/2009 | Herbert | |
| 7,609,037 B1 | 10/2009 | Herbert | |
| 7,633,782 B1 | 12/2009 | Herbert | |
| 7,688,608 B2 | 3/2010 | Oettinger et al. | |
| 7,737,580 B2 | 6/2010 | Hjort et al. | |
| 7,738,266 B2 | 6/2010 | Jacques et al. | |
| 7,778,046 B1 | 8/2010 | Cuk et al. | |
| 7,787,263 B2 | 8/2010 | Oettinger et al. | |
| 7,800,354 B2 | 9/2010 | Kanouda et al. | |
| 7,852,017 B1 | 12/2010 | Melanson | |
| 7,852,471 B2 | 12/2010 | Hosemans | |
| 7,855,472 B2 | 12/2010 | Hjort et al. | |
| 7,880,400 B2 | 2/2011 | Zhou et al. | |
| 7,889,524 B2 | 2/2011 | Lee et al. | |
| 7,903,439 B2 | 3/2011 | Oettinger et al. | |
| 7,919,950 B2 | 4/2011 | Uno et al. | |
| 7,919,958 B2 | 4/2011 | Oettinger et al. | |
| 7,939,968 B2 | 5/2011 | Hjort et al. | |
| 8,040,704 B2 | 10/2011 | Cuk | |
| 8,053,927 B2 | 11/2011 | Hjort et al. | |
| 8,076,920 B1 | 12/2011 | Melanson | |
| 8,084,893 B2 | 12/2011 | Fujii | |
| 8,125,158 B2 | 2/2012 | Nishino et al. | |
| 8,169,151 B2 | 5/2012 | Kimura | |
| 8,169,799 B2 | 5/2012 | Takeuchi | |
| 8,213,190 B2 | 7/2012 | Li | |
| 8,228,696 B2 | 7/2012 | Uno | |
| 8,232,780 B2 | 7/2012 | Uno | |
| 8,261,100 B2 | 9/2012 | Paniagua, Jr. et al. | |
| 8,278,899 B2 | 10/2012 | Schafmeister et al. | |
| 8,296,587 B2 | 10/2012 | Paniagua, Jr. et al. | |
| 8,305,051 B2 | 11/2012 | Phadke et al. | |
| 8,368,252 B2 | 2/2013 | Pabon | |
| 8,385,032 B1 | 2/2013 | Mao et al. | |
| 8,395,366 B2 | 3/2013 | Uno | |
| 8,441,822 B2 | 5/2013 | de Groot et al. | |
| 8,450,878 B2 | 5/2013 | Rada et al. | |
| 8,482,945 B2 | 7/2013 | Kojima | |
| 8,488,346 B2 | 7/2013 | Usami | |
| 8,497,637 B2 | 7/2013 | Liu | |
| 8,502,463 B2 | 8/2013 | Mizukawa et al. | |
| 8,508,958 B2 | 8/2013 | Orr et al. | |
| 8,564,993 B2 | 10/2013 | Lin | |
| 8,605,464 B2 | 12/2013 | Sase et al. | |
| 8,614,595 B2 | 12/2013 | Acatrinei | |
| 8,614,902 B2 | 12/2013 | Pansier et al. | |
| 8,654,551 B2 | 2/2014 | Sase et al. | |
| 8,674,544 B2 | 3/2014 | Rada et al. | |
| 8,680,783 B2 | 3/2014 | Athalye | |
| 8,705,252 B2 | 4/2014 | Duvnjak | |
| 8,711,593 B2 | 4/2014 | Ho et al. | |
| 8,723,487 B2 | 5/2014 | Pahlevaninezhad et al. | |
| 8,724,348 B2 | 5/2014 | Sase et al. | |
| 8,749,149 B2 | 6/2014 | Naruo et al. | |
| 8,754,590 B2 | 6/2014 | Makino et al. | |
| 8,766,561 B2 | 7/2014 | Esaki et al. | |
| 8,810,146 B1 | 8/2014 | Mays, II et al. | |
| 8,817,494 B2 | 8/2014 | Usui | |
| 8,823,335 B2 | 9/2014 | Sugahara et al. | |
| 8,824,180 B2 | 9/2014 | Usami | |
| 8,884,464 B2 | 11/2014 | Jayaraman et al. | |
| 8,929,107 B2 | 1/2015 | Kang et al. | |
| 8,952,632 B2 | 2/2015 | Du et al. | |
| 8,953,341 B2 | 2/2015 | Fahlenkamp | |
| 8,953,347 B2 | 2/2015 | Jin et al. | |
| 8,957,600 B1 | 2/2015 | Levy | |
| 8,975,773 B2 | 3/2015 | Huang | |
| 8,987,995 B2 | 3/2015 | Moussakov et al. | |
| 9,001,539 B2 | 4/2015 | Oh | |
| 9,019,735 B2 | 4/2015 | Jeong et al. | |
| 9,035,566 B2 | 5/2015 | Du et al. | |
| 9,041,314 B2 | 5/2015 | Makino et al. | |
| 9,041,379 B2 | 5/2015 | Lyons | |
| 9,047,075 B1 | 6/2015 | Lee | |
| 9,047,076 B1 | 6/2015 | Lee | |
| 9,049,762 B2 | 6/2015 | Liu | |
| 9,054,595 B2 | 6/2015 | Umetani | |
| 9,065,327 B2 | 6/2015 | Hampo et al. | |
| 9,088,216 B2 | 7/2015 | Garrity et al. | |
| 9,093,917 B2 | 7/2015 | Ho et al. | |
| 9,107,259 B2 | 8/2015 | Rimmer et al. | |
| 9,123,467 B2 | 9/2015 | Wu et al. | |
| 9,124,176 B2 | 9/2015 | Mueller | |
| 9,166,480 B2 | 10/2015 | Yonezawa et al. | |
| 9,166,483 B2 | 10/2015 | Levy | |
| 9,203,365 B1 | 12/2015 | Milbert et al. | |
| 9,241,381 B2 | 1/2016 | Feng et al. | |
| 9,244,476 B2 | 1/2016 | Ribarich et al. | |
| 9,257,864 B2 | 2/2016 | Pahlevaninezhad et al. | |
| 9,258,859 B2 | 2/2016 | Makino et al. | |

(56) References Cited

U.S. PATENT DOCUMENTS

| | | |
|---|---|---|
| 9,263,939 B2 | 2/2016 | Jin et al. |
| 9,263,967 B2 | 2/2016 | McCune |
| 9,268,351 B2 | 2/2016 | Rutter et al. |
| 9,269,489 B2 | 2/2016 | Wu et al. |
| 9,270,188 B2 | 2/2016 | Yan et al. |
| 9,271,349 B2 | 2/2016 | Radermacher |
| 9,287,783 B2 | 3/2016 | Yamashita et al. |
| 9,293,979 B2 | 3/2016 | Usami |
| 9,295,117 B2 | 3/2016 | Acatrinei |
| 9,301,350 B2 | 3/2016 | Levy |
| 9,310,038 B2 | 4/2016 | Athalye |
| 9,312,750 B2 | 4/2016 | Kwan et al. |
| 9,320,131 B2 | 4/2016 | Williams |
| 9,331,566 B1 | 5/2016 | Banayan et al. |
| 9,332,601 B2 | 5/2016 | Levy |
| 9,343,970 B2 | 5/2016 | Yan et al. |
| 9,374,016 B2 | 6/2016 | Yamada |
| 9,380,655 B2 | 6/2016 | Levy |
| 9,391,524 B2 | 7/2016 | Oh et al. |
| 9,397,555 B2 | 7/2016 | Usami |
| 9,401,653 B2 | 7/2016 | Soares et al. |
| 9,407,156 B2 | 8/2016 | Nussbaum et al. |
| 9,407,160 B2 | 8/2016 | Balpe |
| 9,407,164 B2 | 8/2016 | Chang et al. |
| 9,408,273 B2 | 8/2016 | Wee et al. |
| 9,413,227 B2 | 8/2016 | Huang et al. |
| 9,419,510 B2 | 8/2016 | Liu |
| 9,444,280 B2 | 9/2016 | Lee |
| 9,445,468 B1 | 9/2016 | Cheng et al. |
| 9,448,577 B2 | 9/2016 | Kouroussis et al. |
| 9,455,620 B2 | 9/2016 | Yu et al. |
| 9,466,974 B2 | 10/2016 | Hsieh et al. |
| 9,479,048 B2 | 10/2016 | Gabrielsson et al. |
| 9,479,159 B2 | 10/2016 | Zojer |
| 9,490,694 B2 | 11/2016 | Alam |
| 9,510,403 B2 | 11/2016 | Levy |
| 9,523,719 B2 | 12/2016 | Mossoba et al. |
| 9,531,282 B1 | 12/2016 | Nikitin |
| 9,548,619 B2 | 1/2017 | Gazit |
| 9,577,540 B1 | 2/2017 | Xiong |
| 9,578,728 B2 | 2/2017 | Hebborn et al. |
| 9,590,492 B2 | 3/2017 | Chang et al. |
| 9,590,494 B1 | 3/2017 | Zhou et al. |
| 9,590,512 B2 | 3/2017 | Yonezawa et al. |
| 9,590,513 B2 | 3/2017 | Fahlenkamp |
| 9,595,865 B2 | 3/2017 | John et al. |
| 9,602,018 B2 | 3/2017 | Herfurth |
| 9,608,524 B2 | 3/2017 | Yamada |
| 9,608,532 B2 | 3/2017 | Wong et al. |
| 9,632,120 B2 | 4/2017 | Lim et al. |
| 9,637,011 B2 | 5/2017 | Biagini |
| 9,654,024 B2 | 5/2017 | Cohen |
| 9,655,179 B2 | 5/2017 | Brandt |
| 9,660,517 B2 | 5/2017 | Hirota et al. |
| 9,667,132 B2 | 5/2017 | Ghosh et al. |
| 9,667,171 B2 | 5/2017 | Hara et al. |
| 9,673,709 B1 | 6/2017 | Teo et al. |
| 9,674,907 B1 | 6/2017 | Xiong et al. |
| 9,685,853 B2 | 6/2017 | De Sousa |
| 9,685,881 B2 | 6/2017 | Ghosh et al. |
| 9,698,768 B2 | 7/2017 | Leong et al. |
| 9,699,848 B2 | 7/2017 | Herfurth et al. |
| 9,705,411 B2 | 7/2017 | Jang et al. |
| 9,712,045 B2 | 7/2017 | Mao et al. |
| 9,722,487 B2 | 8/2017 | Halim et al. |
| 9,722,500 B2 | 8/2017 | Usami |
| 9,729,066 B1 | 8/2017 | Lu et al. |
| 9,742,261 B2 | 8/2017 | Young |
| 9,742,272 B2 | 8/2017 | Yamada |
| 9,755,505 B2 | 9/2017 | Usami |
| 9,761,370 B2 | 9/2017 | Wu et al. |
| 9,762,115 B2 | 9/2017 | Sharma |
| 9,768,700 B2 | 9/2017 | Oh et al. |
| 9,780,691 B1 | 10/2017 | Usami |
| 9,783,900 B2 | 10/2017 | Grant |
| 9,787,104 B2 | 10/2017 | Murayama et al. |
| 9,793,754 B2 | 10/2017 | Myhre et al. |
| 9,796,258 B1* | 10/2017 | Bundschuh ............... B60K 6/42 |
| 9,806,519 B2 | 10/2017 | Cheng |
| 9,821,670 B2 | 11/2017 | Biagini |
| 9,825,545 B2 | 11/2017 | Chen et al. |
| 9,825,552 B1 | 11/2017 | Usami |
| 9,837,288 B2 | 12/2017 | Basler et al. |
| 9,837,910 B2 | 12/2017 | Izumi |
| 9,848,467 B2 | 12/2017 | Li et al. |
| 9,866,108 B2 | 1/2018 | Mayell et al. |
| 9,866,122 B2 | 1/2018 | Werner et al. |
| 9,887,616 B2 | 2/2018 | Bai et al. |
| 9,887,619 B2 | 2/2018 | Kutschak et al. |
| 9,894,727 B2 | 2/2018 | Wee et al. |
| 9,911,731 B2 | 3/2018 | Deboy |
| 9,917,515 B2 | 3/2018 | Lemmen et al. |
| 9,917,520 B2 | 3/2018 | Wu |
| 9,917,524 B2 | 3/2018 | Fang et al. |
| 9,923,448 B2 | 3/2018 | Nikitin |
| 9,929,585 B2 | 3/2018 | Bai et al. |
| 9,931,951 B2 | 4/2018 | Khaligh et al. |
| 9,941,785 B2 | 4/2018 | Kim et al. |
| 9,941,801 B2 | 4/2018 | Young |
| 9,960,686 B2 | 5/2018 | Yu et al. |
| 9,973,028 B2 | 5/2018 | Namuduri et al. |
| 9,973,077 B2 | 5/2018 | Chen |
| 9,973,078 B2 | 5/2018 | Usami |
| 9,973,129 B2 | 5/2018 | Schuster et al. |
| 9,992,827 B2 | 6/2018 | Moussakov et al. |
| 10,562,404 B1* | 2/2020 | Khaligh ................. H02M 1/44 |
| 2001/0036086 A1 | 11/2001 | Pascu et al. |
| 2001/0046146 A1 | 11/2001 | Batarseh et al. |
| 2002/0033679 A1 | 3/2002 | Hui et al. |
| 2002/0039298 A1 | 4/2002 | Riggio et al. |
| 2002/0110012 A1 | 8/2002 | Liu et al. |
| 2002/0172056 A1 | 11/2002 | Riggio et al. |
| 2002/0176263 A1 | 11/2002 | Riggio et al. |
| 2002/0181250 A1 | 12/2002 | Riggio et al. |
| 2003/0002303 A1 | 1/2003 | Riggio et al. |
| 2003/0035311 A1 | 2/2003 | Phadke |
| 2003/0095421 A1 | 5/2003 | Kadatskyy et al. |
| 2003/0174521 A1 | 9/2003 | Batarseh et al. |
| 2003/0202368 A1 | 10/2003 | Ierymenko |
| 2003/0210024 A1 | 11/2003 | Liu et al. |
| 2003/0223255 A1 | 12/2003 | Ben-Yaakov et al. |
| 2004/0012986 A1 | 1/2004 | Riggio et al. |
| 2004/0047167 A1 | 3/2004 | Prasad et al. |
| 2004/0136208 A1 | 7/2004 | Agarwal et al. |
| 2004/0156217 A1 | 8/2004 | Phadke |
| 2005/0088376 A1 | 4/2005 | Inoue et al. |
| 2005/0117374 A1 | 6/2005 | Sheehy et al. |
| 2005/0168198 A1 | 8/2005 | Maksimovic et al. |
| 2005/0270813 A1 | 12/2005 | Zhang et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0267561 A1 | 11/2006 | Domb et al. |
| 2006/0274468 A1 | 12/2006 | Phadke |
| 2006/0284568 A1 | 12/2006 | Chang et al. |
| 2007/0008747 A1 | 1/2007 | Soldano et al. |
| 2007/0124606 A1 | 5/2007 | Hsieh |
| 2007/0145956 A1 | 6/2007 | Takeuchi |
| 2007/0236976 A1 | 10/2007 | Malik |
| 2008/0001695 A1 | 1/2008 | Riggio et al. |
| 2008/0013351 A1* | 1/2008 | Alexander ............ H02M 7/797 363/123 |
| 2008/0037293 A1 | 2/2008 | Jacques et al. |
| 2008/0122422 A1 | 5/2008 | Zhang et al. |
| 2008/0222431 A1 | 9/2008 | Paniagua et al. |
| 2008/0239765 A1 | 10/2008 | Popescu et al. |
| 2008/0284388 A1 | 11/2008 | Oettinger et al. |
| 2008/0284399 A1 | 11/2008 | Oettinger et al. |
| 2008/0284400 A1 | 11/2008 | Oettinger et al. |
| 2008/0284401 A1 | 11/2008 | Oettinger et al. |
| 2008/0285313 A1 | 11/2008 | Oettinger et al. |
| 2008/0288201 A1 | 11/2008 | Oettinger et al. |
| 2008/0290846 A1 | 11/2008 | Kanouda et al. |

(56) References Cited

U.S. PATENT DOCUMENTS

| | | |
|---|---|---|
| 2009/0010031 A1 | 1/2009 | Kuan |
| 2009/0079355 A1 | 3/2009 | Zhou et al. |
| 2009/0103341 A1 | 4/2009 | Lee et al. |
| 2009/0129131 A1 | 5/2009 | Hosemans |
| 2009/0177906 A1 | 7/2009 | Paniagua, Jr. et al. |
| 2009/0185398 A1 | 7/2009 | Cuk |
| 2009/0268488 A1 | 10/2009 | Fujii |
| 2009/0310386 A1 | 12/2009 | Takeuchi |
| 2010/0046264 A1 | 2/2010 | Ho et al. |
| 2010/0066261 A1 | 3/2010 | Kimura |
| 2010/0097829 A1 | 4/2010 | Uno et al. |
| 2010/0109571 A1 | 5/2010 | Nishino et al. |
| 2010/0164579 A1 | 7/2010 | Acatrinei |
| 2010/0181963 A1* | 7/2010 | Schreiber ............... H02J 7/02 320/108 |
| 2010/0187914 A1 | 7/2010 | Rada et al. |
| 2010/0188876 A1 | 7/2010 | Garrity et al. |
| 2010/0225170 A1 | 9/2010 | Hjort et al. |
| 2010/0259240 A1 | 10/2010 | Cuk |
| 2011/0001362 A1 | 1/2011 | de Groot et al. |
| 2011/0057724 A1 | 3/2011 | Pabon |
| 2011/0075458 A1 | 3/2011 | Phadke et al. |
| 2011/0115458 A1 | 5/2011 | Schafmeister et al. |
| 2011/0148202 A1 | 6/2011 | Rada et al. |
| 2011/0176343 A1 | 7/2011 | Kojima |
| 2011/0188273 A1 | 8/2011 | Pansier et al. |
| 2011/0194206 A1 | 8/2011 | Sase et al. |
| 2011/0204823 A1 | 8/2011 | Mizukawa et al. |
| 2011/0211377 A1 | 9/2011 | Uno |
| 2011/0216558 A1 | 9/2011 | Uno |
| 2011/0216560 A1 | 9/2011 | Ye |
| 2011/0227415 A1 | 9/2011 | Hjort et al. |
| 2011/0227492 A1 | 9/2011 | Du et al. |
| 2011/0227493 A1 | 9/2011 | Du et al. |
| 2011/0292703 A1 | 12/2011 | Cuk |
| 2011/0309682 A1 | 12/2011 | Chiba |
| 2012/0001563 A1 | 1/2012 | Rimmer et al. |
| 2012/0014149 A1 | 1/2012 | Usami |
| 2012/0033451 A1 | 2/2012 | Usui |
| 2012/0044722 A1 | 2/2012 | Cuk |
| 2012/0057382 A1 | 3/2012 | Uno |
| 2012/0063184 A1* | 3/2012 | Mazumder .......... H02M 7/4807 363/98 |
| 2012/0086277 A1 | 4/2012 | Hjort et al. |
| 2012/0092909 A1 | 4/2012 | Usami |
| 2012/0092910 A1 | 4/2012 | Sugahara et al. |
| 2012/0092911 A1 | 4/2012 | Usami |
| 2012/0106216 A1 | 5/2012 | Tzinker et al. |
| 2012/0120697 A1 | 5/2012 | Cuk |
| 2012/0133293 A1 | 5/2012 | Shin |
| 2012/0139505 A1 | 6/2012 | Ren et al. |
| 2012/0147494 A1 | 6/2012 | Sase et al. |
| 2012/0153855 A1 | 6/2012 | Sun |
| 2012/0200230 A1 | 8/2012 | Esaki et al. |
| 2012/0201061 A1 | 8/2012 | Hampo et al. |
| 2012/0242235 A1 | 9/2012 | Naruo et al. |
| 2012/0243275 A1 | 9/2012 | Lin |
| 2012/0250360 A1 | 10/2012 | Orr et al. |
| 2012/0262084 A1 | 10/2012 | Liu |
| 2012/0262954 A1 | 10/2012 | Duvnjak |
| 2012/0287684 A1 | 11/2012 | Fahlenkamp |
| 2012/0293141 A1 | 11/2012 | Zhang et al. |
| 2012/0320648 A1* | 12/2012 | Harrison ............. H02M 1/4216 363/126 |
| 2013/0020989 A1 | 1/2013 | Xia et al. |
| 2013/0038242 A1 | 2/2013 | Athalye |
| 2013/0039104 A1 | 2/2013 | Sharma |
| 2013/0049699 A1 | 2/2013 | Jayaraman et al. |
| 2013/0050879 A1 | 2/2013 | Mao et al. |
| 2013/0100710 A1 | 4/2013 | Kang et al. |
| 2013/0126337 A1 | 5/2013 | Grant |
| 2013/0188397 A1 | 7/2013 | Wu et al. |
| 2013/0188401 A1 | 7/2013 | Jin et al. |
| 2013/0188405 A1 | 7/2013 | Jin et al. |
| 2013/0194698 A1 | 8/2013 | Sase et al. |
| 2013/0194843 A1 | 8/2013 | Ofek |
| 2013/0207468 A1 | 8/2013 | Wu et al. |
| 2013/0207601 A1 | 8/2013 | Wu et al. |
| 2013/0229126 A1 | 9/2013 | Ribarich et al. |
| 2013/0249472 A1 | 9/2013 | Hsu |
| 2013/0250579 A1 | 9/2013 | Athalye |
| 2013/0250627 A1 | 9/2013 | Herfurth |
| 2013/0300303 A1 | 11/2013 | Liu |
| 2013/0301305 A1 | 11/2013 | Orr et al. |
| 2013/0322129 A1 | 12/2013 | Yonezawa et al. |
| 2014/0092640 A1 | 4/2014 | Yamashita et al. |
| 2014/0097668 A1 | 4/2014 | Huang |
| 2014/0119070 A1 | 5/2014 | Jeong et al. |
| 2014/0140113 A1 | 5/2014 | Oh |
| 2014/0146573 A1 | 5/2014 | Yan et al. |
| 2014/0160805 A1 | 6/2014 | Oh et al. |
| 2014/0167513 A1 | 6/2014 | Chang et al. |
| 2014/0204635 A1 | 7/2014 | Umetani |
| 2014/0239831 A1 | 8/2014 | Makino et al. |
| 2014/0252973 A1 | 9/2014 | Liu |
| 2014/0268959 A1* | 9/2014 | Frohman ............. H02M 7/4807 363/98 |
| 2014/0292287 A1 | 10/2014 | Rutter et al. |
| 2014/0300274 A1 | 10/2014 | Acatrinei |
| 2014/0334195 A1 | 11/2014 | Nussbaum et al. |
| 2014/0355319 A1 | 12/2014 | Cohen |
| 2014/0368111 A1 | 12/2014 | Hebborn et al. |
| 2014/0369006 A1 | 12/2014 | Williams |
| 2015/0019038 A1 | 1/2015 | Kouroussis et al. |
| 2015/0043258 A1 | 2/2015 | Usami |
| 2015/0049517 A1 | 2/2015 | Yan et al. |
| 2015/0091456 A1 | 4/2015 | Levy |
| 2015/0091457 A1 | 4/2015 | Levy |
| 2015/0091458 A1 | 4/2015 | Levy |
| 2015/0091462 A1 | 4/2015 | Levy |
| 2015/0091466 A1 | 4/2015 | Levy |
| 2015/0092458 A1 | 4/2015 | Levy |
| 2015/0097528 A1 | 4/2015 | Biagini |
| 2015/0109708 A1 | 4/2015 | Cheng |
| 2015/0109829 A1 | 4/2015 | Usami |
| 2015/0109839 A1 | 4/2015 | Usami |
| 2015/0131337 A1 | 5/2015 | Gabrielsson et al. |
| 2015/0134165 A1 | 5/2015 | Biagini |
| 2015/0138847 A1 | 5/2015 | Fahlenkamp |
| 2015/0138850 A1 | 5/2015 | Pan et al. |
| 2015/0138851 A1 | 5/2015 | Yonezawa et al. |
| 2015/0155772 A1 | 6/2015 | De Sousa |
| 2015/0162822 A1 | 6/2015 | Ho et al. |
| 2015/0189710 A1 | 7/2015 | Lin et al. |
| 2015/0191840 A1 | 7/2015 | Grant |
| 2015/0197868 A1 | 7/2015 | Grant |
| 2015/0207402 A1 | 7/2015 | Kwan et al. |
| 2015/0230304 A1 | 8/2015 | Makino et al. |
| 2015/0252970 A1 | 9/2015 | Athalye |
| 2015/0263605 A1 | 9/2015 | Alam |
| 2015/0263628 A1 | 9/2015 | Russell et al. |
| 2015/0263639 A1 | 9/2015 | Russell et al. |
| 2015/0263640 A1 | 9/2015 | Russell et al. |
| 2015/0263646 A1 | 9/2015 | Hara et al. |
| 2015/0312989 A1 | 10/2015 | Wee et al. |
| 2015/0318685 A1 | 11/2015 | Hsieh et al. |
| 2015/0318781 A1 | 11/2015 | Huang et al. |
| 2015/0333637 A1 | 11/2015 | Izumi |
| 2015/0364989 A1 | 12/2015 | Chung et al. |
| 2015/0372584 A1 | 12/2015 | Hirota et al. |
| 2015/0372585 A1 | 12/2015 | Kutschak et al. |
| 2015/0372614 A1 | 12/2015 | Yamada |
| 2015/0380968 A1 | 12/2015 | Lee |
| 2015/0381031 A1 | 12/2015 | Ghosh et al. |
| 2016/0006299 A1 | 1/2016 | Myhre et al. |
| 2016/0016479 A1 | 1/2016 | Khaligh et al. |
| 2016/0036318 A1 | 2/2016 | Young |
| 2016/0043648 A1 | 2/2016 | Usami |
| 2016/0064160 A1 | 3/2016 | Lemmen et al. |
| 2016/0065056 A1* | 3/2016 | Chen ................. H02M 1/4233 363/89 |
| 2016/0065077 A1 | 3/2016 | Yamada |
| 2016/0065203 A1 | 3/2016 | Zojer |
| 2016/0072392 A1 | 3/2016 | Soares et al. |

(56) References Cited

U.S. PATENT DOCUMENTS

| | | |
|---|---|---|
| 2016/0079965 A1 | 3/2016 | Afridi et al. |
| 2016/0087457 A1 | 3/2016 | Murayama et al. |
| 2016/0099660 A1 | 4/2016 | Khaligh et al. |
| 2016/0103155 A1 | 4/2016 | Mossoba et al. |
| 2016/0105056 A1 | 4/2016 | Namurdri et al. |
| 2016/0105095 A1 | 4/2016 | Mayell et al. |
| 2016/0141951 A1 | 5/2016 | Mao et al. |
| 2016/0141964 A1 | 5/2016 | Yu et al. |
| 2016/0165688 A1 | 6/2016 | Makino et al. |
| 2016/0181918 A1 | 6/2016 | Herfurth et al. |
| 2016/0181927 A1 | 6/2016 | Chang et al. |
| 2016/0190912 A1 | 6/2016 | Lim et al. |
| 2016/0190914 A1 | 6/2016 | Kim et al. |
| 2016/0268919 A1 | 9/2016 | Halberstadt |
| 2016/0290957 A1 | 10/2016 | Ram et al. |
| 2016/0294205 A1 | 10/2016 | Zimnicki et al. |
| 2016/0294291 A1 | 10/2016 | Oh et al. |
| 2016/0294298 A1 | 10/2016 | Wong et al. |
| 2016/0301305 A1 | 10/2016 | Yamada |
| 2016/0316567 A1 | 10/2016 | Gruber et al. |
| 2016/0330808 A1 | 11/2016 | Brandt |
| 2016/0351559 A1 | 12/2016 | Deboy |
| 2016/0358838 A1 | 12/2016 | Basler et al. |
| 2016/0358886 A1 | 12/2016 | Meyer-Berg et al. |
| 2016/0359427 A1 | 12/2016 | Ghosh et al. |
| 2016/0365817 A1 | 12/2016 | Schuster et al. |
| 2017/0019095 A1 | 1/2017 | Leong et al. |
| 2017/0025962 A1 | 1/2017 | Davidson |
| 2017/0077818 A1 | 3/2017 | Werner et al. |
| 2017/0079095 A1 | 3/2017 | Fang et al. |
| 2017/0085183 A1 | 3/2017 | Notsch |
| 2017/0098956 A1 | 4/2017 | Sarti |
| 2017/0099710 A1 | 4/2017 | Liu |
| 2017/0117810 A1 | 4/2017 | Ghosh et al. |
| 2017/0118814 A1 | 4/2017 | Wee et al. |
| 2017/0126134 A1 | 5/2017 | Young |
| 2017/0163163 A1 | 6/2017 | Jang et al. |
| 2017/0229972 A1* | 8/2017 | Cerqueira Pinto Bezerra Varajão .................. H02M 7/797 |
| 2017/0237339 A1 | 8/2017 | Young et al. |
| 2017/0250620 A1 | 8/2017 | Whit et al. |
| 2017/0279267 A1 | 9/2017 | Cheng |
| 2017/0279367 A1 | 9/2017 | Qiu et al. |
| 2017/0288557 A1 | 10/2017 | Fang et al. |
| 2017/0294848 A1 | 10/2017 | Levin et al. |
| 2017/0324338 A1 | 11/2017 | Usami |
| 2017/0329380 A1 | 11/2017 | Hung et al. |
| 2017/0346386 A1 | 11/2017 | Sharma |
| 2018/0026520 A1 | 1/2018 | Hirota et al. |
| 2018/0027630 A1 | 1/2018 | DeJonge et al. |
| 2018/0062542 A1 | 3/2018 | Sakakibara |
| 2018/0076729 A1 | 3/2018 | Usami |
| 2018/0083542 A1 | 3/2018 | Werner et al. |
| 2018/0091041 A1 | 3/2018 | Feng et al. |
| 2018/0102262 A1 | 4/2018 | Basler et al. |
| 2018/0109193 A1 | 4/2018 | Hirota et al. |
| 2018/0118040 A1 | 5/2018 | Kim et al. |
| 2018/0123442 A1 | 5/2018 | Vangala et al. |
| 2018/0166997 A1 | 6/2018 | Russell et al. |
| 2018/0222333 A1 | 8/2018 | Khaligh et al. |
| 2018/0234028 A1 | 8/2018 | Chen et al. |
| 2018/0241299 A1 | 8/2018 | Jitaru |
| 2018/0241318 A1 | 8/2018 | Chen et al. |
| 2018/0254732 A1 | 9/2018 | Smolenaers |
| 2018/0278181 A1 | 9/2018 | Afridi et al. |
| 2018/0281608 A1 | 10/2018 | Albanna et al. |
| 2018/0309372 A1 | 10/2018 | Leong et al. |
| 2018/0323701 A1 | 11/2018 | Sano et al. |
| 2018/0352622 A1 | 12/2018 | Ng |
| 2018/0367040 A1 | 12/2018 | Birth |
| 2019/0008022 A1 | 1/2019 | DeJonge et al. |
| 2019/0036366 A1 | 1/2019 | Dohmeier et al. |
| 2019/0044439 A1 | 2/2019 | Ohshima |
| 2019/0052179 A1 | 2/2019 | Bhandarkar et al. |
| 2019/0067958 A1 | 2/2019 | Zimnicki et al. |
| 2019/0081571 A1 | 3/2019 | Chung et al. |
| 2019/0097532 A1 | 3/2019 | Yamada |
| 2019/0098725 A1 | 3/2019 | Sadwick et al. |
| 2019/0103808 A1 | 4/2019 | Yamada |
| 2019/0146014 A1 | 5/2019 | Pohlmann et al. |
| 2019/0149038 A1 | 5/2019 | Haneda |
| 2019/0190394 A1 | 6/2019 | Jitaru |
| 2019/0198355 A1 | 6/2019 | Basler et al. |
| 2019/0199202 A1 | 6/2019 | Davidson |
| 2019/0207521 A1 | 7/2019 | Brady et al. |
| 2019/0222068 A1 | 7/2019 | Choi et al. |
| 2019/0222117 A1 | 7/2019 | Poon |
| 2019/0229609 A1 | 7/2019 | Li et al. |
| 2019/0260290 A1 | 8/2019 | Maejima |
| 2019/0267903 A1 | 8/2019 | Brady et al. |
| 2019/0268984 A1 | 8/2019 | Song et al. |
| 2019/0313490 A1 | 10/2019 | Gallivanoni et al. |
| 2019/0320515 A1 | 10/2019 | Sadwick |
| 2019/0326811 A1 | 10/2019 | Li et al. |
| 2019/0326813 A1 | 10/2019 | Li et al. |
| 2019/0326829 A1 | 10/2019 | Hashimoto et al. |
| 2019/0327818 A1 | 10/2019 | DeJonge et al. |
| 2019/0334431 A1 | 10/2019 | Spohn et al. |
| 2019/0356236 A1 | 11/2019 | Yamada |
| 2019/0386579 A1 | 12/2019 | Leong |
| 2020/0022222 A1 | 1/2020 | Bratianu-Badea et al. |
| 2020/0036317 A1 | 1/2020 | Yu et al. |
| 2020/0039375 A1 | 2/2020 | Ammanamanchi Venkata et al. |
| 2020/0044562 A1 | 2/2020 | Alipour |
| 2020/0062408 A1 | 2/2020 | Bratianu-Badea et al. |
| 2020/0067413 A1 | 2/2020 | Birth |
| 2020/0067424 A1* | 2/2020 | Yu .......................... H02M 1/088 |
| 2020/0099288 A1 | 3/2020 | Young et al. |
| 2020/0099311 A1 | 3/2020 | Askarianabyaneh et al. |
| 2020/0112249 A1 | 4/2020 | Oettinger et al. |
| 2020/0161962 A1 | 5/2020 | Liu et al. |
| 2020/0169160 A1 | 5/2020 | Kikuchi et al. |
| 2020/0177073 A1 | 6/2020 | Davidson |
| 2020/0189731 A1 | 6/2020 | Mistry et al. |
| 2020/0195151 A1 | 6/2020 | Chen |
| 2020/0220466 A1 | 7/2020 | Backman |
| 2020/0225684 A1 | 7/2020 | Anderson et al. |
| 2020/0235656 A1 | 7/2020 | Forouzesh et al. |
| 2020/0298722 A1 | 9/2020 | Smolenaers |
| 2020/0313572 A1 | 10/2020 | Alharbi et al. |
| 2020/0321856 A1 | 10/2020 | Takatsuji et al. |
| 2020/0321867 A1 | 10/2020 | Radecker et al. |
| 2020/0328668 A1 | 10/2020 | Li et al. |
| 2020/0328671 A1 | 10/2020 | Li et al. |
| 2020/0366182 A1 | 11/2020 | Bieber |
| 2020/0375002 A1 | 11/2020 | Das |
| 2021/0008987 A1* | 1/2021 | Vahedi ................ H02J 7/00714 |
| 2021/0122255 A1* | 4/2021 | Liang ..................... B60L 53/22 |
| 2021/0155100 A1* | 5/2021 | Khaligh ................ H02M 7/797 |

OTHER PUBLICATIONS

U.S. Appl. No. 10/015,849, filed Jul. 3, 2018, Liu.
U.S. Appl. No. 10/020,742, filed Jul. 10, 2018, Werner et al.
U.S. Appl. No. 10/049,962, filed Aug. 14, 2018, Meyer-Berg et al.
U.S. Appl. No. 10/062,671, filed Aug. 28, 2018, Gruber et al.
U.S. Appl. No. 10/063,092, filed Aug. 28, 2018, Sarti.
U.S. Appl. No. 10/063,138, filed Aug. 28, 2018, Zhou et al.
U.S. Appl. No. 10/079,554, filed Sep. 18, 2018, Tremblay.
U.S. Appl. No. 10/090,775, filed Oct. 2, 2018, Halberstadt.
U.S. Appl. No. 10/103,644, filed Oct. 16, 2018, Khaligh et al.
U.S. Appl. No. 10/116,233, filed Oct. 30, 2018, Chen et al.
U.S. Appl. No. 10/122,285, filed Nov. 6, 2018, Lu et al.
U.S. Appl. No. 10/135,359, filed Nov. 20, 2018, Chen et al.
U.S. Appl. No. 10/148,170, filed Dec. 4, 2018, Feng et al.
U.S. Appl. No. 10/148,260, filed Dec. 4, 2018, Tomasovics et al.
U.S. Appl. No. 10/177,646, filed Jan. 8, 2019, Chung et al.
U.S. Appl. No. 10/205,400, filed Feb. 12, 2019, Afridi et al.
U.S. Appl. No. 10/211,742, filed Feb. 19, 2019, Vangala et al.
U.S. Appl. No. 10/224,818, filed Mar. 5, 2019, Hirota et al.
U.S. Appl. No. 10/243,475, filed Mar. 26, 2019, Usami.
U.S. Appl. No. 10/250,121, filed Apr. 2, 2019, Hirota et al.

(56) References Cited

OTHER PUBLICATIONS

U.S. Appl. No. 10/256,119, filed Apr. 9, 2019, Basler et al.
U.S. Appl. No. 10/256,741, filed Apr. 9, 2019, Russell et al.
U.S. Appl. No. 10/263,508, filed Apr. 16, 2019, Davidson.
U.S. Appl. No. 10/274,455, filed Apr. 30, 2019, Ram et al.
U.S. Appl. No. 10/284,077, filed May 7, 2019, Leisten et al.
U.S. Appl. No. 10/312,800, filed Jun. 4, 2019, Yamada.
U.S. Appl. No. 10/312,804, filed Jun. 4, 2019, Ohshima.
U.S. Appl. No. 10/326,357, filed Jun. 18, 2019, Alipour.
U.S. Appl. No. 10/326,373, filed Jun. 18, 2019, Brady et al.
U.S. Appl. No. 10/338,658, filed Jul. 2, 2019, Hung et al.
U.S. Appl. No. 10/340,685, filed Jul. 2, 2019, Cheng.
U.S. Appl. No. 10/340,724, filed Jul. 2, 2019, Albanna et al.
U.S. Appl. No. 10/342,100, filed Jul. 2, 2019, DeJonge et al.
U.S. Appl. No. 10/367,413, filed Jul. 30, 2019, Hamond et al.
U.S. Appl. No. 10/374,507, filed Aug. 6, 2019, Nikitin.
U.S. Appl. No. 10/374,513, filed Aug. 6, 2019, Yamada.
U.S. Appl. No. 10/381,936, filed Aug. 13, 2019, Ahsanuzzaman et al.
U.S. Appl. No. 10/439,508, filed Oct. 8, 2019, Adragna.
U.S. Appl. No. 10/447,148, filed Oct. 15, 2019, Elferich et al.
U.S. Appl. No. 10/454,367, filed Oct. 22, 2019, Davidson.
U.S. Appl. No. 10/461,658, filed Oct. 29, 2019, Adragna.
U.S. Appl. No. 10/491,107, filed Nov. 26, 2019, Poon.
U.S. Appl. No. 10/491,131, filed Nov. 26, 2019, Bhandarkar et al.
U.S. Appl. No. 10/498,225, filed Dec. 3, 2019, Li et al.
U.S. Appl. No. 10/498,226, filed Dec. 3, 2019, Li et al.
U.S. Appl. No. 10/498,240, filed Dec. 3, 2019, Birth.
U.S. Appl. No. 10/514,139, filed Dec. 24, 2019, Athalye.
U.S. Appl. No. 10/523,113, filed Dec. 31, 2019, Sano et al.
U.S. Appl. No. 10/530,269, filed Jan. 7, 2020, Hashimoto et al.
U.S. Appl. No. 10/536,073, filed Jan. 14, 2020, Young et al.
U.S. Appl. No. 10/541,600, filed Jan. 21, 2020, Haneda.
U.S. Appl. No. 10/542,597, filed Jan. 21, 2020, Ng.
U.S. Appl. No. 10/548,202, filed Jan. 28, 2020, DeJonge et al.
U.S. Appl. No. 10/594,207, filed Mar. 17, 2020, Li et al.
U.S. Appl. No. 10/640,001, filed May 5, 2020, Kim et al.
U.S. Appl. No. 10/644,586, filed May 5, 2020, Alipour.
U.S. Appl. No. 10/680,461, filed Jun. 9, 2020, Sarti.
U.S. Appl. No. 10/686,368, filed Jun. 16, 2020, Hahre et al.
U.S. Appl. No. 10/686,385, filed Jun. 16, 2020, Brown et al.
U.S. Appl. No. 10/693,365, filed Jun. 23, 2020, Yamada.
U.S. Appl. No. 10/696,182, filed Jun. 30, 2020, Khaligh et al.
U.S. Appl. No. 10/707,747, filed Jul. 7, 2020, Davidson.
U.S. Appl. No. 10/708,979, filed Jul. 7, 2020, Bratianu-Badea et al.
U.S. Appl. No. 10/720,787, filed Jul. 21, 2020, Dohmeier et al.
U.S. Appl. No. 10/734,250, filed Aug. 4, 2020, Basler et al.
U.S. Appl. No. 10/742,129, filed Aug. 11, 2020, Jitaru.
U.S. Appl. No. 10/744,898, filed Aug. 18, 2020, Yang et al.
U.S. Appl. No. 10/750,594, filed Aug. 18, 2020, Moussakov et al.
U.S. Appl. No. 10/771,001, filed Sep. 8, 2020, Smolenaers.
U.S. Appl. No. 10/778,025, filed Sep. 15, 2020, Gazit.
U.S. Appl. No. 10/820,394, filed Oct. 27, 2020, DeJonge et al.

* cited by examiner

THREE PHASE BIDIRECTIONAL AC-DC CONVERTER WITH BIPOLAR VOLTAGE FED RESONANT STAGES

CROSS REFERENCE TO RELATED APPLICATIONS

The present application is a non-provisional of, and claims benefit of priority from U.S. Provisional Patent Application No. 62/926,206, filed Oct. 25, 2019, the entirety of which is expressly incorporated herein by reference.

FIELD OF INVENTION

The present invention relates to the field of multiphase integrated bidirectional power electronic converters, and more particularly to such a converter interfaced with a battery connected to a three-phase grid system.

BACKGROUND OF THE INVENTION

In a conventional two-stage AC-DC resonant converter, a three-phase active front-end (AFE) boost PFC rectifier feeds an interleaved three phase resonant converter. The input is a low frequency AC power signal, e.g., 50-400 Hz. The resonant converter part contains a high frequency AC converter followed by a rectifier stage. In the traditional approach, the AC-AC part of the converter requires twelve semiconductors, out of which six are hard-switched, limiting the switching frequency and hence reducing the power density.

Three phase AC-DC converters play a crucial role when the electric power is consumed in the DC form. With the advent of Energy Storage (ES) applications, Electric Vehicles (EVs) and More Electric Aircrafts (MEA), the demand for high power density (>30 W/in$^3$), high efficiency (>95%) for compact AC-DC converters with the power rating more than 20 kW is increasing [1-4].

Figure 1:
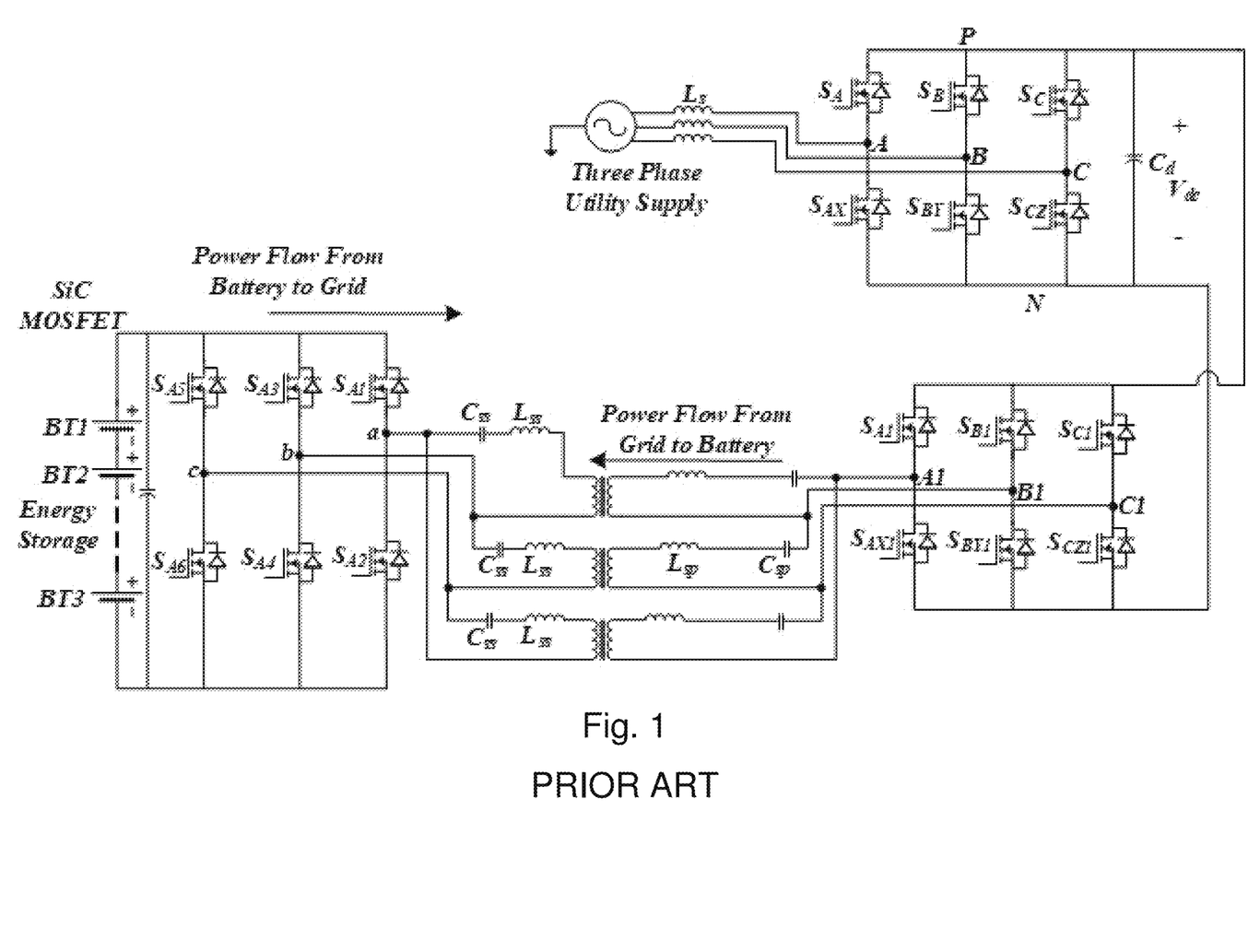
FIG. 1 shows a prior art (conventional) three phase bidirectional front end, with three-phase interleaved full bridge output side converters.
Figure 2:
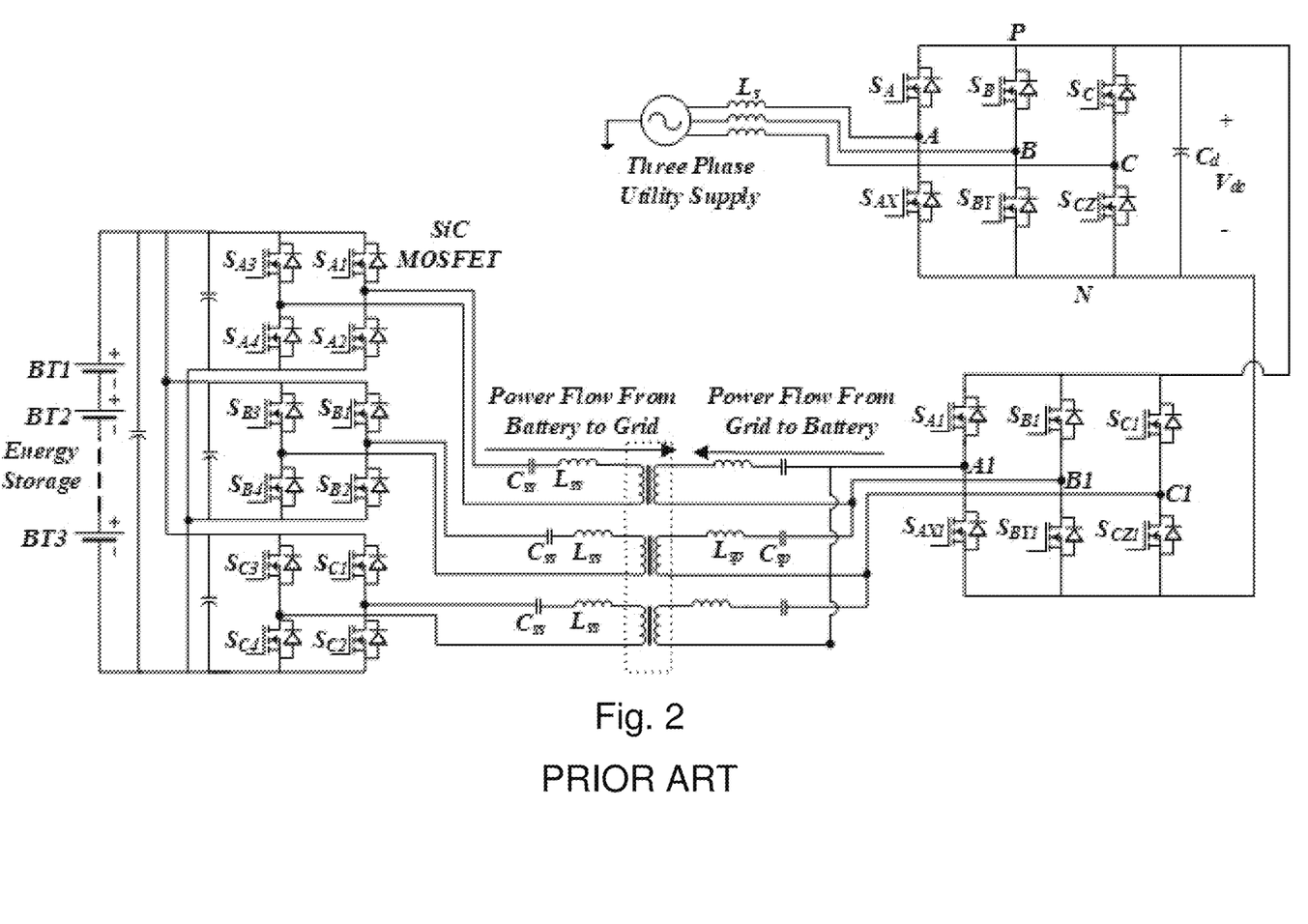
FIG. 2 shows a prior art (conventional) three phase bidirectional front end, with triple single phase parallel full bridge output side converters for the respective phases.

In this regard, a variety of converters have been proposed covering different aspects [6-9]. In a conventional three-phase interleaved full-bridge output rectifier configuration as shown in FIG. 1, 18 switches are required [4-5], and in a conventional three, single phase parallel full-bridge output rectifier configuration as shown in FIG. 2, 24 switches are required. In these designs, the input power is first synchronously rectified using a three-phase interleaved full-bridge (two switches per phase) configuration, and then the rectified DC voltage is modulated as a high frequency AC intermediate signal, using an interleaved full-bridge (two switches per phase), resulting in a requirement for twelve switches in the front end, half are hard-switched, operating at a limited switching frequency, and half are soft switched operating at much higher switching frequency.

Hard switching occurs when there is an overlap between voltage and current when switching the transistor on and off. This overlap causes energy losses which can be minimized by increasing the di/dt and dv/dt. However, higher di/dt or dv/dt causes EMI to be generated. Therefore, the di/dt and dv/dt should be optimized to avoid EMI issues. To minimize the EMI effects and to improve efficiency, an improved hard switching technique called quasi-resonant switching was developed (mainly seen in flyback converters). In this mode, the transistor is turned on when the voltage across drain and source is at a minimum (in a valley) in order to minimize the switching losses and to improve efficiency. Switching the transistor when the voltage is at a minimum helps reduce the hard switching effect which causes EMI. Switching when a valley is detected, rather than at a fixed frequency, introduces frequency jitter. This has the benefit of spreading the RF emissions and reducing EMI overall.

Soft switching begins when one electrical parameter reaches zero (current or voltage) before the switch is turned on or off. This has benefits in terms of losses. Also, since the switching loss per transition decreases, the semiconductors can be switched at higher frequency reducing the size of converter. The smooth resonant switching waveforms also minimize EMI. Common topologies like phase-shifted ZVS and LLC are soft switched only at turn-on. For zero voltage switching (ZVS), the transistor will be turned on at zero VDS voltage to reduce the turn-on switching loss. For zero current switching (ZCS), the transistor will be turned off at zero $I_D$ current to reduce the turn off switching loss.

Most resonant circuits are half- or full-bridge topologies (two or four transistors). As transistors are switched on and off, energy can be left in the transistor and this can cause failure. Due to switching times, if this only happens occasionally a rugged body diode is sufficient. If due to fast transition times it happens continually, then a fast body diode is required to make sure all the energy will leave the transistor.

A nine-switch power converter design is known [12]. This design is a reduced switch topology of conventional twelve-switch back to back converter. It has three legs with three switches in each of the leg compared to six legs with two switches in each leg of the conventional twelve-switch converter. The top switches in each leg along with corresponding middle switches work as the rectifier and the bottom switches along with the middle switches work as the inverter. Hence the middle switches are shared by both rectifier and inverter, reducing the switch count by 25%. This converter can operate in both constant frequency mode, where the output frequency is same as the input utility frequency and the variable frequency mode, where the output frequency is adjustable.

REFERENCES (Each of the following is expressly incorporated herein by reference in its entirety)

[1] J. Lai, L. Zhang, Z. Zahid, N. Tseng, C. Lee and C. Lin, "A high-efficiency 3.3-kW bidirectional on-board charger," 2015 *IEEE 2nd International Future Energy Electronics Conference (IFEEC)*, Taipei, 2015, pp. 1-5.

[2] D. Gautam, F. Musavi, M. Edington, W. Eberle and W. G. Dunford, "An automotive on-board 3.3 kW battery charger for PHEV application," 2011 *IEEE Vehicle Power and Propulsion Conference*, Chicago, Ill., 2011, pp. 1-6.

[3] H. Kim, M. Ryu, J. Baek and J. Jung, "High-Efficiency Isolated Bidirectional AC-DC Converter for a DC Distribution System," in *IEEE Transactions on Power Electronics*, vol. 28, no. 4, pp. 1642-1654, April 2013.

[4] B. Li, Q. Li, F. C. Lee, Z. Liu and Y. Yang, "A High-Efficiency High-Density Wide-Bandgap Device-Based Bidirectional On-Board Charger," in *IEEE Journal of Emerging and Selected Topics in Power Electronics*, vol. 6, no. 3, pp. 1627-1636, September 2018.

[5] R. Gadelrab, Y. Yang, B. Li, F. Lee and Q. Li, "High-Frequency High-Density Bidirectional EV Charger," 2018 *IEEE Transportation Electrification Conference and Expo (ITEC)*, Long Beach, C A, 2018, pp. 687-694.

[6] Guanghai Gong, M. L. Heldwein, U. Drofenik, J. Minibock, K. Mino and J. W. Kolar, "Comparative evaluation of three-phase high-power-factor AC-DC converter concepts for application in future More Electric Aircraft," in *IEEE Transactions on Industrial Electronics*, vol. 52, no. 3, pp. 727-737, June 2005.

[7] Mallik and A. Khaligh, "Intermediate DC-Link Capacitor Reduction in a Two-Stage Cascaded AC/DC Converter for More Electric Aircrafts," in *IEEE Transactions on Vehicular Technology*, vol. 67, no. 2, pp. 935-947, February 2018.

[8] K. Ali, R. K. Surapaneni, P. Das and S. K. Panda, "An SiC-MOSFET-Based Nine-Switch Single-Stage Three-Phase AC-DC Isolated Converter," in *IEEE Transactions on Industrial Electronics*, vol. 64, no. 11, pp. 9083-9093, November 2017.

[9] L. Zhang, P. C. Loh and F. Gao, "An Integrated Nine-Switch Power Conditioner for Power Quality Enhancement and Voltage Sag Mitigation," in *IEEE Transactions on Power Electronics*, vol. 27, no. 3, pp. 1177-1190, March 2012.

[10] H. Zhou and A. M. Khambadkone, "Hybrid Modulation for Dual-Active-Bridge Bidirectional Converter With Extended Power Range for Ultracapacitor Application," in *IEEE Transactions on Industry Applications*, vol. 45, no. 4, pp. 1434-1442, July-August 2009.

[11] J. Everts, F. Krismer, J. Van den Keybus, J. Driesen and J. W. Kolar, "Optimal ZVS Modulation of Single-Phase Single-Stage Bidirectional DAB AC-DC Converters," in *IEEE Transactions on Power Electronics*, vol. 29, no. 8, pp. 3954-3970, August 2014.

[12] C. Liu, B. Wu, N. R. Zargari, D. Xu and J. Wang, "A Novel Three-Phase Three-Leg AC/AC Converter Using Nine IGBTs," in *IEEE Transactions on Power Electronics*, vol. 24, no. 5, pp. 1151-1160, May2009.

[13] Ding, T.; Kou, Y.; Yang, Y.; Zhang, Y.; Yan, H.; Blaabjerg, F. Evaluating maximum photovoltaic integration in district distribution systems considering optimal inverter dispatch and cloud shading conditions. IET Renew. Power Gener. 2017, 11, 165-172.

[14] Blaabjerg, F.; Ma, K. Wind Energy Systems. *Proc. IEEE* 2017, 105, 2116-2131.

[15] Bose, B. K. Power Electronics, Smart Grid, and Renewable Energy Systems. Proc. IEEE 2017, 105, 2011-2018.

[16] Popavath, L. N.; Kaliannan, P. Photovoltaic-STATCOM with Low Voltage Ride through Strategy and Power Quality Enhancement in a Grid Integrated Wind-PV System. Electronics 2018, 7, 51.

[17] Blaabjerg, F.; Yang, Y.; Yang, D.; Wang, X. Distributed Power-Generation Systems and Protection. Proc. IEEE 2017, 105, 1311-1331.

[18] Arya, S. R.; Singh, B.; Niwas, R.; Chandra, A.; Al-Haddad, K. Power Quality Enhancement Using DSTATCOM in Distributed Power Generation System. IEEE Trans. Ind. Appl. 2016, 52, 5203-5212.

[19] Sekhar, V. C.; Kant, K.; Singh, B. DSTATCOM supported induction generator for improving power quality. IET Renew. Power Gener. 2016, 10, 495-503.

[20] Liu, C.; Wu, B.; Zargari, N. R.; Xu, D.; Wang, J. A Novel Three-Phase Three-Leg AC/AC Converter Using Nine IGBTs. IEEE Trans. Power Electron. 2009, 24, 1151-1160.

[21] Liu, X.; Wang, P.; Loh, P. C.; Blaabjerg, F. A Compact Three-Phase Single-Input/Dual-Output Matrix Converter. IEEE Trans. Ind. Electron. 2012, 59, 6-16.

[22] Liu, X.; Loh, P. C.; Wang, P.; Blaabjerg, F. A Direct Power Conversion Topology for Grid Integration of Hybrid AC/DC Energy Resources. IEEE Trans. Ind. Electron. 2013, 60, 5696-5707.

[23] Diab, M. S.; Elserougi, A. A.; Abdel-Khalik, A. S.; Massoud, A. M.; Ahmed, S. A Nine-Switch-Converter-Based Integrated Motor Drive and Battery Charger System for EVs Using Symmetrical Six-Phase Machines. IEEE Trans. Ind. Electron. 2016, 63, 5326-5335.

[24] Dehghan, S. M.; Mohamadian, M.; Yazdian, A. Hybrid Electric Vehicle Based on Bidirectional Z-Source Nine-Switch Inverter. IEEE Trans. Veh. Technol. 2010, 59, 2641-2653.

[25] Liu, C.; Wu, B.; Zargari, N.; Xu, D. A novel nine-switch PWM rectifier-inverter topology for three-phase UPS applications. In Proceedings of the 2007 European Conference on Power Electronics and Applications, Aalborg, Denmark, 2-5 Sep. 2007; pp. 1-10.

[26] Loh, P. C.; Zhang, L.; Gao, F. Compact Integrated Energy Systems for Distributed Generation. IEEE Trans. Ind. Electron. 2013, 60, 1492-1502.

[27] Qin, Z.; Loh, P. C.; Blaabjerg, F. Application Criteria for Nine-Switch Power Conversion Systems with Improved Thermal Performance. IEEE Trans. Power Electron. 2015, 30, 4608-4620.

[28] Ali, K.; Das, P.; Panda, S. K. A Special Application Criterion of Nine-Switch Converter with Reduced Conduction Loss. IEEE Trans. Ind. Electron. 2017, 64, 2853-2862.

[29] Rahman, K.; Al-Emadi, N.; Iqbal, A.; Rahman, S. Common mode voltage reduction technique in a three-to-three phase indirect matrix converter. IET Electr. Power Appl. 2018, 12, 254-263.

[30] Park, K.; Lee, K. B.; Blaabjerg, F. Improving Output Performance of a Z-Source Sparse Matrix Converter Under Unbalanced Input-Voltage Conditions. IEEE Trans. Power Electron. 2012, 27, 2043-2054.

[31] Shi, T.; Zhang, X.; An, S.; Yan, Y.; Xia, C. Harmonic suppression modulation strategy for ultra-sparse matrix converter. IET Power Electron. 2016, 9, 589-599.

[32] Ledezma, E.; McGrath, B.; Munoz, A.; Lipo, T. A. Dual AC-drive system with a reduced switch count. IEEE Trans. Ind. Appl. 2001, 37, 1325-1333. [Green Version]

[33] Blaabjerg, F.; Freysson, S.; Hansen, H. H.; Hansen, S. A new optimized space-vector modulation strategy for a component-minimized voltage source inverter. IEEE Trans. Power Electron. 1997, 12, 704-714.

[34] da Silva, C. H.; Pereira, R. R.; da Silva, L. E. B.; Lambert-Torres, G.; Bose, B. K.; Ahn, S. U. A Digital PLL Scheme for Three-Phase System Using Modified Synchronous Reference Frame. IEEE Trans. Ind. Electron. 2010, 57, 3814-3821.

[35] Sakakibara, U.S. US20180062542A1

SUMMARY OF THE INVENTION

In a conventional two-stage AC-DC resonant converter, a three-phase active front-end (AFE) boost power factor correction (PFC) rectifier feeds an interleaved three-phase resonant converter, as shown in FIGS. 1 and 2. The resonant converter part contains a high frequency AC converter followed by a rectifier stage.

The present invention integrates the front-end boost PFC rectifier and the high frequency converter stage of the resonant converter into a single stage low frequency AC to high frequency AC front-end converter. This modified front end feeds the resonant tank and the rectifier stage forming the complete AC-DC converter.

In the traditional approach the AC-AC part of the converter requires 12 semiconductors out of which six are hard switched, limiting the switching frequency and hence reducing the power density. In the present approach the same is achieved with nine semiconductors, reducing the cost and increasing the power density. Out of the nine switches, six are completely soft switched and the remaining three are semi-soft switched, resulting in much higher switching frequency operation. This makes the converter solution compact, since the higher switching frequency permits use of physically smaller components.

Along with the proposed 9-switch front end converter, based on the type of rectifier used on the DC side the disclosure proposes two converter variations. The first variation uses a six-switch output rectifier and is suitable for low power applications (<5 kW). This solution reduces the total number of semiconductors, without substantially compromising the efficiency. The second variation uses twelve switch rectifiers (four-switch full bridge rectifier in each phase) and is suitable for high power applications (>5 kW). This solution results in the higher efficiency. Each variation saves three semiconductors in the front-end stage as compared to the prior design, and results in superior efficiency compared to the conventional solution.

The input ports of the resonant tanks are connected in delta form at the nine-switch front end. The interleaved three phase modulation results in a bipolar voltage input to the resonant tank, and hence the series capacitors in the resonant tank are relieved from blocking the DC voltage. This reduces the stress on these capacitors and increases the stability and the lifetime of the converter. Moreover, the interleaved modulation results in 120-degree phase between the inputs of each resonant tank and hence reduces the DC ripple and the filter size on the rectifier side.

Figure 3:
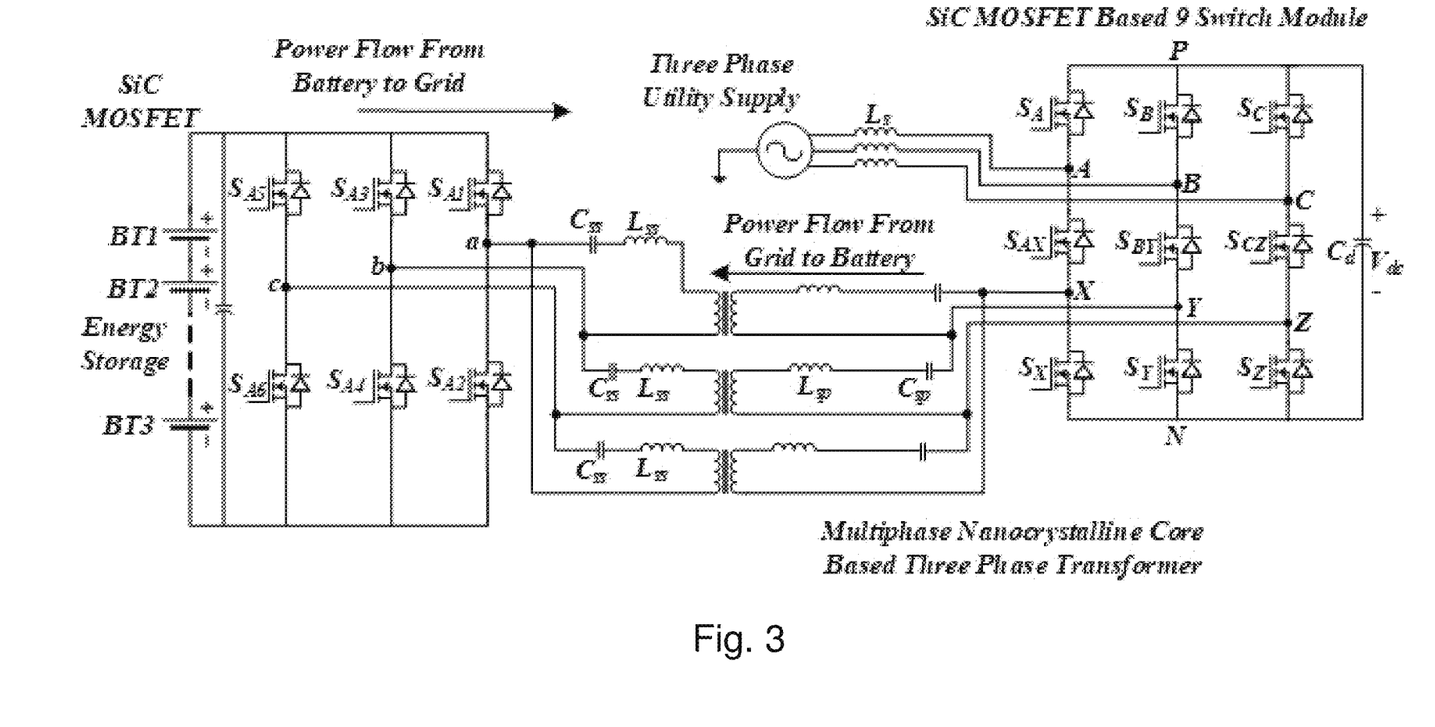
FIG. 3 shows a three-phase integrated bidirectional nine-switch front end, with three phase interleaved full bridge output side converters, according to the present invention.
Figure 4:
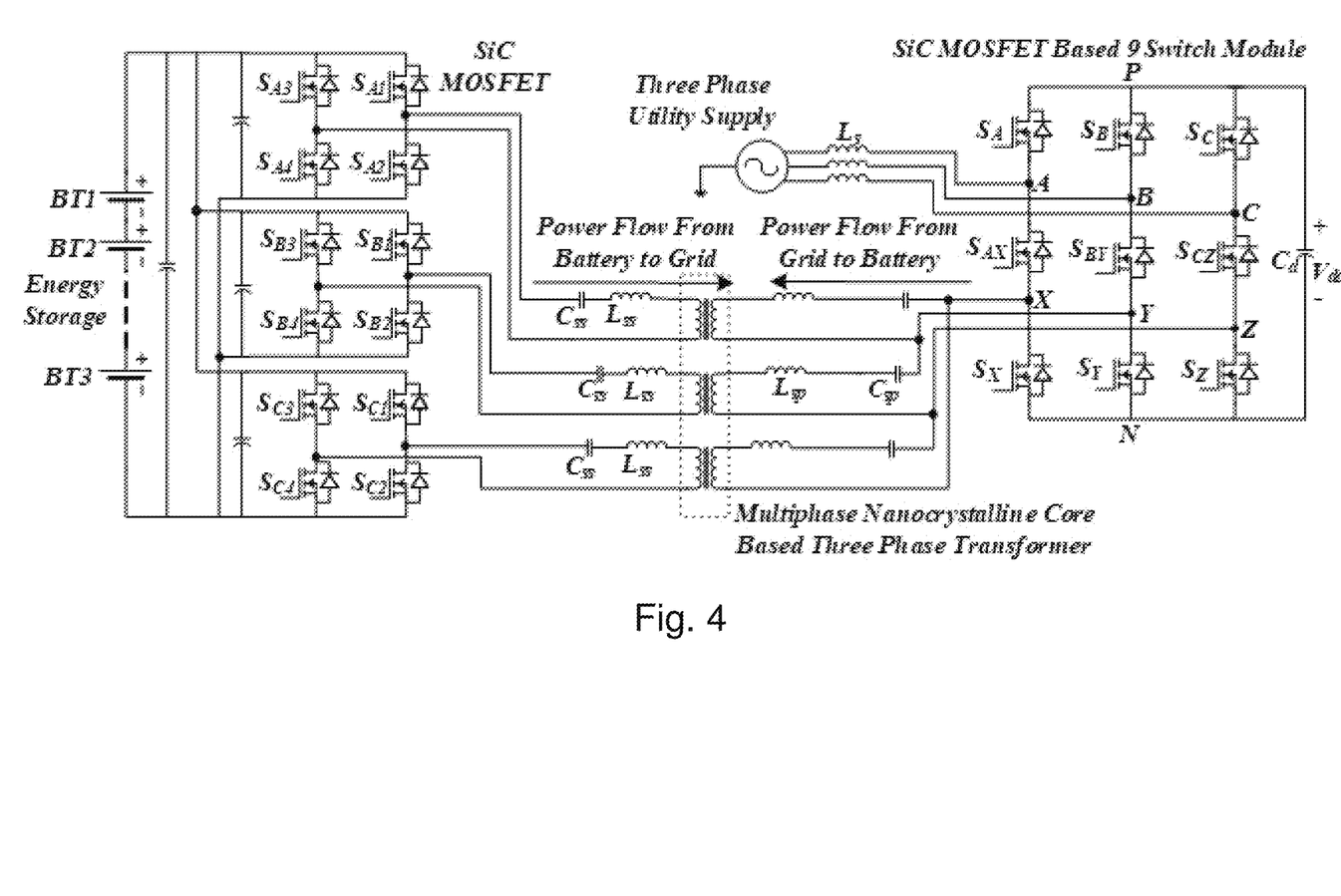
FIG. 4 shows a three-phase integrated bidirectional nine-switch front end with triple single phase parallel full bridge output side converters, according to the present invention.

The present invention thus proposes two related topologies of a three-phase AC-DC isolated converter, based on a front end nine-switch converter and two different rectifier topologies as shown in FIG. 3 (three-phase interleaved full bridge) and FIG. 4 (three, single phase parallel full bridge).

In a conventional configuration, the three-phase interleaved full bridge implementation would require eighteen switches, whereas the present design only needs fifteen semiconductors, resulting in compact converter with less cost. The conventional three, single phase parallel full bridge implementation would require twenty-four semiconductors, whereas the present design needs twenty-one switches. Hence, the converter reduces the device count, and employs more compact cooling, reducing both the size and cost.

Moreover, the switches in present converter are soft switched allowing higher intermediate AC switching frequencies, and hence can use low volume magnetic components and capacitors, as compared to configurations that employ lower intermediate AC switching frequencies, which require physically larger magnetic components (inductors, transformers) and capacitors. Further, the configuration reduces the stress on the capacitors enabling the stability and long life for the converter.

The present converter integrates a front-end boost PFC rectifier and a high frequency converter stage of a typical resonant converter, into a single stage low frequency AC to high frequency AC front-end converter (the nine-switch front-end converter).

In the present approach, the AC-AC part of the converter is achieved with nine semiconductors (three less than the twelve semiconductor designs), reducing the cost and increasing the power density. Out of the nine switches, six are completely soft switched and the remaining three are semi-soft switched, resulting in much higher switching frequency operation. This higher frequency of operation permits the converter to be compact. This low frequency AC to high frequency AC front-end stage is referred to hereinafter as the nine-switch front-end converter.

Based on the type of rectifier used on the DC side, two converter variations are provided. The first variation uses a six-switch rectifier (two-switch three-phase interleaved full bridge rectifier in each phase), and is suitable for low power applications. This solution reduces the total semiconductors without substantially compromising on the efficiency. The second variation uses a twelve-switch rectifier (four-switch full parallel bridge rectifier for each phase) and is suitable for high power applications. This solution results in the higher efficiency. Both the variations save three semiconductors in the front-end stage with respect to a prior design, and also provide superior efficiency compared to the conventional solution.

It is noted that the architecture employs conventional three-phase power, and the design may be readily scaled to accommodate a larger number of phases in less conventional system architectures. Each phase has an input structure comprising three switches (MOSFETs) in series, between a positive and negative rectified output, the input of each phase being between one of the intermediate nodes between the three switches, which is typically filtered with a capacitor. The output is drawn from the other nodes between the switches. The switches in series are driven to synchronously rectify the input AC frequency (two soft switched, and one is semi-soft switched), and produce the output at the high AC frequency. The high frequency is passed through a tank circuit and transformer to a set of bridges run at the high AC frequency, which are either three-phase interleaved full bridges or triple single phase parallel full bridges.

The integrated front end reduces cost compared to conventional converters.

The interleaved modulation reduces the DC ripple and the filter size on the rectifier side, which results in reduction in size of the converter.

The architecture is useful for implementing a medium power AC to DC bidirectional converter for on board electrical vehicle (EV) Charging, energy storage applications, more electric aircraft, and medium voltage electrical drives, for example.

The technology provides superior performance and efficiency facilitated by feeding a bipolar voltage to resonant tank circuits. The high frequency intermediate power transfer helps achieve higher power density and efficiency, and lower cost. Further, the absence of a sustained DC voltage in resonant capacitors leads to stable operation and longer lifetime of the converter. The soft-switching of the semiconductor devices enables high switching frequency high efficiency operation.

A typical design with 240 VAC 60 Hz power may be implemented using 1200V rated, SiC MOSFETs. These switches permit achievement of high power density, high efficiency and provide on-board galvanic isolation. The integrated front end reduces cost compared to conventional converters.

The circuits also do a good job of blocking the injection of high frequency noise back onto the power grid (low THD; high quality power), and reducing output ripple by doing phase balancing according to load using interleaved operation.

In accordance with one aspect of the invention, an integrated three phase bidirectional AC to DC converter is provided that interfaces the power grid with a battery system, and permits battery charging from the grid, and powering of the grid from the stored energy.

In one embodiment, the present invention provides a nine-switch front-end converter which is a multiport converter with two three-phase terminals and a DC link. The nine switches are configured as three sets of three switches in parallel, with the common nodes of the three chains driven to a DC voltage.

One set of terminals of the nine-switch front-end converter (e.g., the respective nodes below the high switch) is connected to the grid, whereas the other set of terminals (e.g., the respective nodes above the low switch) are connected through an L-C resonant tank to primary sides of three High Frequency (HF) transformers, that provide a galvanic isolation for the converter system. Since the design is bidirectional, power may flow from the first set of terminals to the second set of terminals, or from the second set of terminals to the first set of terminals.

The secondary side of the HF transformers are typically connected through another L-C resonant tank to an output side converter, connected to a battery or DC load. Note that the output side converter need not be a simple AC to DC rectifier, and may produce arbitrary output waveforms depending on how the switches are driven, and availability of additional components.

This converter structure (with proper design of resonant elements and modulation techniques) provides soft switching for six switches of the front end nine switch converter, and all of the switches of the output side converter, and provides semi-soft switching for the remaining three switches of the nine-switch converter. This allows operation of the converter with a much higher frequency than the typical operating frequency for a conventional converter. In effect, this brings about a compact and light-weight converter system.

The design further includes a phase shift control [10-11] of the bridges between nine switch and output side converters for the optimal power flow from the grid to the battery (charging mode) as well as from the battery to the grid (discharging mode).

It is therefore an object to provide a bidirectional AC power converter, comprising: a nine-switch front-end comprising three parallel sets of three switches in series, which connects a three phase AC system to a set of three tank circuits having a resonant frequency, the nine-switch front-end being configured to: synchronously bidirectionally convert electrical power between the three-phase system and a DC potential on opposite ends of the parallel sets of switches in series, and convert electrical power between the DC potential and the set of three tank circuits operated at their respective resonant frequency, such that six of the nine switches are soft-switched and three of the nine switches are semi-soft switched; a coupling transformer, configured to bidirectionally couple AC electrical power at the switching frequency for each of the set of three tank circuits; and a synchronous converter, configured to transfer the coupled AC electrical power between the coupling transformer and a secondary system at a switching frequency different from the resonant frequency.

It is also an object to provide a power converter, comprising: a front-end interfacing with a multi-phase AC system, comprising, for each respective phase, a set of three switches in series; a capacitor in parallel with each of the sets of three switches in series; a resonant tank circuit for each respective phase, connected between two of the set of three switches in series for a respective phase; a synchronous converter, configured to interface with a secondary power system; and a coupling transformer, configured to couple power from the resonant tank circuit for each respective phase to the synchronous converter.

Each of the three switches in series may comprise a MOSFET switch, or a MOSFET switch in parallel with a diode. The MOSFET switches may be SiC MOSFET, e.g., having a voltage rating of >1200V.

The three phase AC system may operates between 30-400 Hz, preferably between 50 and 60 Hz. The three phase AC system may operate between 50 and 500 VAC, between 90 and 440 VAC, and preferably between 120-240 VAC. The three phase AC system operates, e.g., at 240 VAC between 50-60 Hz.

The tank circuits may each have a resonant frequency between 2 kHz-150 kHz.

The switching frequency is e.g., >10 kHz, >25 kHz, >50 kHz, >75 kHz, and may be, for example, between 50-150 kHz. the resonant frequency of the tank circuits is preferably higher than a three phase AC system frequency.

The synchronous converter may comprise a six-switch converter controlled to synchronously convert the AC electrical power at the switching frequency, configured as a three-phase interleaved full bridge converter. The synchronous converter may alternatively comprise a twelve-switch converter controlled to synchronously convert the AC electrical power at the switching frequency, configured as three single-phase parallel full bridge converter.

Each tank circuit may comprise a capacitor and an inductor, wherein the nine-switch front-end is configured to present a bipolar AC waveform to the tank circuit that has no DC component.

An automated controller may be provided, configured to control the nine-switch front-end and the synchronous converter.

The automated controller may be configured to perform power factor correction, sequence a startup of the bidirectional AC power converter, and/or balance a phase load on the three phase AC system.

The secondary load may be a battery, and the bidirectional AC power converter may be configured to charge the battery from the three phase AC system in a first mode of operation, and to power the three phase AC system from the battery in a second mode of operation.

The coupling transformer may comprise a separate primary coil and secondary coil for each respective phase of the three phase AC system. The coupling transformer may provide galvanic isolation between the three phase AC system and the secondary load. The coupling transformer may be coupled to the synchronous converter with a respective second tank circuit for each respective phase.

The synchronous converter may be controlled to produce a dynamic waveform at the secondary load distinct from a waveform of the bidirectionally coupled AC electrical power at the switching frequency.

A filter capacitor may be provided across the DC potential and/or the secondary load.

A magnetizing inductance ($L_m$) of the coupling transformer, and the tank circuit may be together configured to maintain zero voltage switching (ZVS) of at least six switches of the nine-switch front end at a load condition, e.g., load conditions comprising a factor of two or four.

The bidirectional AC power converter may comprise an automated controller, configured to control the nine-switch front end in a startup mode to: charge the capacitor with a desired DC potential in a rectifier mode of operation; and after charging the capacitor, initiate operation of the tank circuits by switching at a switching frequency of about double the resonant frequency, and subsequently reduce the frequency of operation until a desired output is achieved at the secondary load. The automated controller may control the nine-switch front end in a low-power mode below 20% of rated output, to operate the set of three tank circuits in a burst mode of operation wherein the switches are alternately turned on and off for intervals of several switching cycles. The automated controller may control the nine-switch front end in a high-power mode above 20% of rated output, to operate the set of three tank circuits in a continuous mode of operation wherein the switches are operated regularly for each switching cycle. The automated controller may regulate output power by a phase shift control of the nine-switch front-end and the synchronous converter.

The power converter may further comprise at automated control, configured to: control the front-end to synchronously convert electrical power between the multi-phase AC system and a DC potential on the capacitor, and convert the DC potential on the capacitor into a switched frequency which passes through the resonant tank circuits, such that two of the set of three switches are soft-switched and one of set of three switches is semi-soft switched.

The synchronous converter may comprise two switches per phase, configured as a phase interleaved full bridge converter, or four switches per phase, configured as a parallel full bridge converter for each phase.

Each resonant tank circuit may comprise a capacitor and an inductor. The resonant frequency of the resonant tank circuits may be higher than an operating frequency of the multi-phase AC system.

An automated controller may control the power converter to perform power factor correction, sequence a startup of the power converter, balance a phase load on the multi-phase AC system, and/or regulate output power by a phase shift control of the sets of three switches in series and the synchronous converter.

The secondary power system may comprise a battery, and the power converter may be configured to charge the battery from the multi-phase AC system in a first mode of operation, and to power the multi-phase AC system from the battery in a second mode of operation.

The coupling transformer may be coupled to the synchronous converter through a respective second resonant tank circuit for each respective phase. The synchronous converter may be controlled to produce a dynamic waveform at the secondary power system distinct from a waveform coupled through the coupling transformer.

A magnetizing inductance ($L_m$) of a respective phase of the coupling transformer, and the resonant tank circuit may be together configured to maintain zero voltage switching (ZVS) in at least two the set of three switches in series at a load condition, e.g., over a range of load conditions comprising a factor of two or four.

An automated controller may be provided to control the sets of three switches in series in a startup mode to charge the capacitor with a desired DC voltage in a rectifier mode of operation; and after charging the capacitor, initiate operation of the resonant tank circuits by switching at a switching frequency of about double a resonant frequency, and subsequently reduce the frequency of operation until a desired output is achieved at the secondary load. The Sets of three switches in series may be controlled in in a low-power mode below 20% of rated output, to operate the set of resonant tank circuits in a burst mode of operation wherein the switches are alternately turned on and off for intervals of several switching cycles. The sets of three switches in series may be controlled in a high-power mode above 20% of rated output, to operate the set of three tank circuits in a continuous mode of operation wherein the switches are operated regularly for each switching cycle.

It is another object to provide a method of power conversion, comprising: providing a power converter, comprising a front-end interfacing with a multi-phase AC system, comprising, for each respective phase, a set of three switches in series, a capacitor in parallel with each of the sets of three switches in series, a resonant tank circuit for each respective phase, connected between two of the set of three switches in series for a respective phase, a synchronous converter, configured to interface with a secondary power system, and a coupling transformer, configured to couple power from the resonant tank circuit for each respective phase to the synchronous converter; and automatically controlling the set of three switches in series and the synchronous converter, to control the front-end to synchronously convert electrical power between the multi-phase AC system and a DC potential on the capacitor, and convert the DC potential on the capacitor into a switched frequency which passes through the resonant tank circuits, such that two of the set of three switches are soft-switched and one of set of three switches is semi-soft switched. The synchronous converter may be controlled to operate at a switching frequency different from a resonant frequency of the resonant tank circuit. A resonant frequency of the resonant tank circuits may be higher than an operating frequency of the multi-phase AC system.

The method may further comprise maintaining zero voltage switching (ZVS) in at least two the set of three switches in series at a load condition.

In a startup mode, the capacitor may be charged with a desired DC voltage in a rectifier mode of operation, and after charging the capacitor, operation of the resonant tank circuits initiated by switching at a switching frequency of about double a resonant frequency, and subsequently reducing the frequency of operation until a desired output is achieved at the secondary load.

The set of three switches in series for each phase may comprise a pair of set of three switches in series, providing a complementary interface for each respective phase.

DETAILED DESCRIPTION OF THE PREFERRED EMBODIMENTS

FIG. 3 and FIG. 4 show the two alternate topologies. In FIG. 3, the front-end side converter has three legs. Each leg has three switches connected as top, middle and bottom. The midpoints of top and middle switches of the converter are connected to the three-phase grid, with an interfacing inductor in each leg.

The midpoints of middle and bottom switches of the converter are connected to the primary side of three High Frequency (HF) Transformers through an L-C resonant link to provide galvanic isolation. The output side converter has three legs with two switches in each leg. The one terminal of secondary side of the three HF transformers are connected to each leg of the output side converter through another L-C resonant link. The other terminal of the secondary side of the three HF transformers are connected to the adjacent leg of the output side converter (i.e. to pints 'b', 'c' and 'a' respectively).

An electrolytic DC capacitor is connected at the DC link of the nine-switch front end converter. Another DC capacitor is connected in parallel to the battery at the output side converter to filter out the DC ripple.

In FIG. 4, the 9-switch front end converter is same as in FIG. 3. However, the output side converter constitutes three separate sub-converters connected in parallel (each converter with two legs having two switches in each leg). The two terminals of secondary side of the three HF transformers are connected to each leg of the sub-converters through an L-C resonant link. A DC electrolytic capacitor is connected across output of each sub-converter to filter out the DC ripple.

Figure 5:
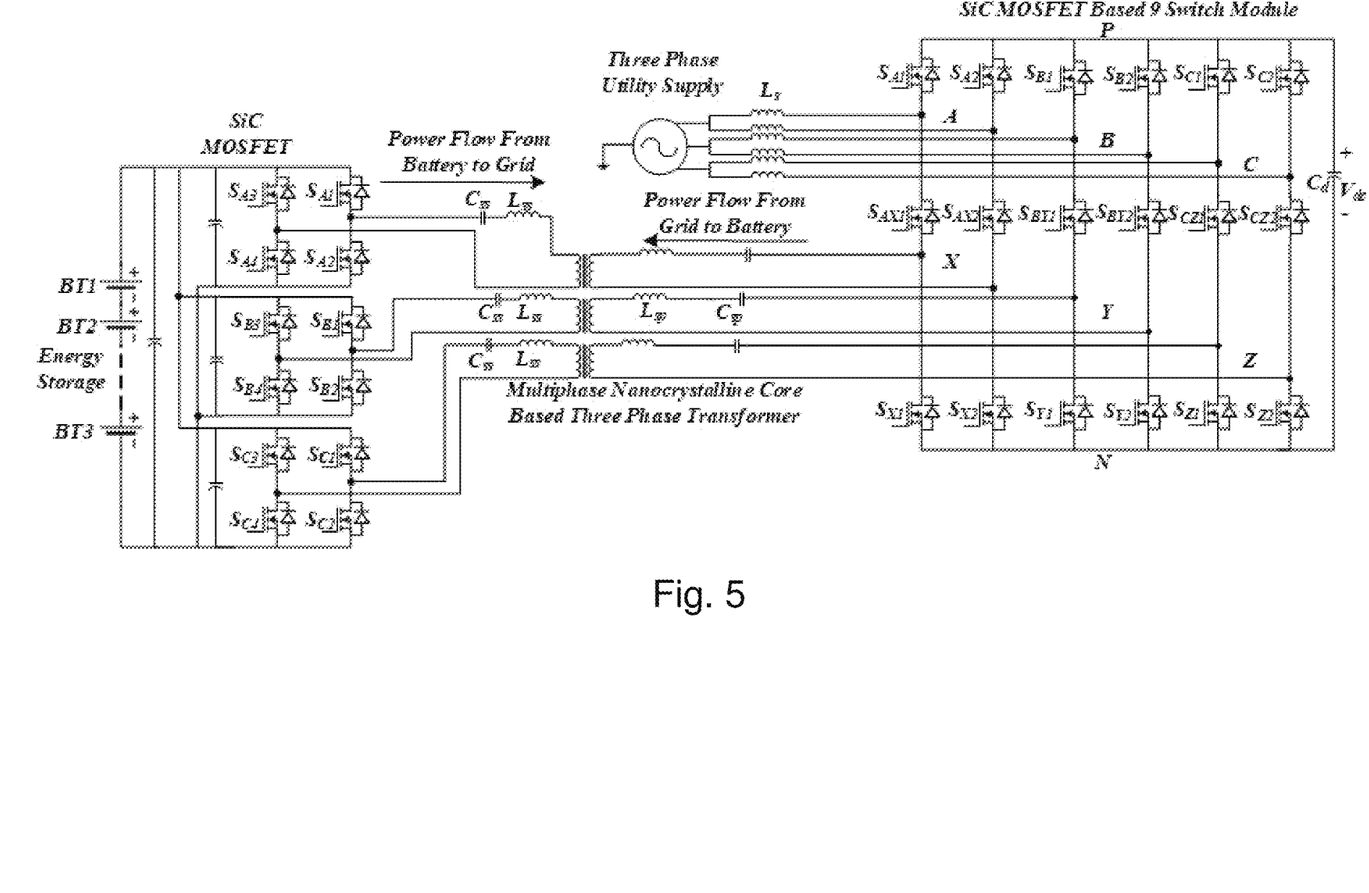
FIG. 5 shows a variant of the circuit according to FIG. 4, with dual nine-switch front ends and differential input connection at input side of resonant tank, and triple single phase parallel full bridge output side converters.

FIG. 5 differs in that each input phase is duplicated, and the nine-switch front end is correspondingly duplicated. The midpoints of middle and bottom switches of the legs corresponding to each phase are respectively connected to a nano-crystalline core based, multi-phase transformer through an L-C resonant link. The output side is same as in FIG. 4.

With use of Silicon Carbide (SiC) MOSFETs rated for 1200 V or above, this converter is practically realizable with high switching frequency operation (>75 kHz).

To maintain zero voltage switching (ZVS) across different loading conditions, the design of magnetizing inductance ($L_m$) of the high frequency transformer, L-C resonant tank design and switch selection are important. Therefore, an optimized value of magnetizing inductance ($L_m$) of high frequency transformer and L-C resonant tank design are provided for the range of loads. A desired switch (SiC MOSFET) based on the figure of merit (FOM) is selected to have ZVS across different output power levels for both the front end and output side converters.

The switches are operated according to the following control sequence.

Startup Mode:
Charge the DC link capacitor with a desired DC voltage using the nine-switch front-end in a rectifier mode of operation. Thereafter, the L-C resonant converter is turned on with a high frequency (i.e., around two times the resonant frequency of the converter) and the frequency is reduced until the converter stabilizes to a constant desired output DC voltage.

Low Power Mode:
At below 20% loads, the L-C resonant converter would be operated in burst mode of operation (the switches will be turned on at certain interval of few switching cycles).

High Power Mode:
At 20%-100% loads, the L-C resonant converter would be operated with normal (cycle-continuous) switching operation.

Power Transfer Mode:
Power transfer during both charging and discharging modes for different output power schemes is regulated through a phase shift control of the bridges between the nine-switch front-end and the output side converters.

What is claimed is:
1. A bidirectional AC power converter, comprising:
   a nine-switch front-end comprising three parallel sets of three switches in series, which connects a three phase AC system to a set of three tank circuits having a resonant frequency,
   the nine-switch front-end being configured to:
      synchronously bidirectionally convert electrical power between the three-phase system and a DC potential on opposite ends of the parallel sets of switches in series, and
      convert electrical power between the DC potential and the set of three tank circuits operated at their respective resonant frequency;
   a coupling transformer, configured to bidirectionally couple AC electrical power at the switching frequency for each of the set of three tank circuits; and
   a synchronous converter, configured to transfer the coupled AC electrical power between the coupling transformer and a secondary system at a switching frequency different from the resonant frequency.

2. The bidirectional AC power converter according to claim 1, wherein each of the three switches in series of the nine-switch front-end comprises a MOSFET switch, and wherein the three phase AC system operates between 50 and 500 VAC at between 30 and 400 Hz.

3. The bidirectional AC power converter according to claim 1, wherein the tank circuits each have a resonant frequency between 2 kHz-150 kHz.

4. The bidirectional AC power converter according to claim 1, wherein the switching frequency is >25 kHz.

5. The bidirectional AC power converter according to claim 1, wherein the synchronous converter comprises a six-switch converter controlled to synchronously convert the AC electrical power at the switching frequency, configured as a three-phase interleaved full bridge converter.

6. The bidirectional AC power converter according to claim 1, wherein the synchronous converter comprises a twelve-switch converter controlled to synchronously convert the AC electrical power at the switching frequency, configured as three single-phase parallel full bridge converter.

7. The bidirectional AC power converter according to claim 1, wherein each tank circuit comprises a capacitor and an inductor, wherein the nine-switch front-end is configured to present a bipolar AC waveform to the tank circuit that has no DC component.

8. The bidirectional AC power converter according to claim 1, further comprising an automated controller, configured to control the nine-switch front-end and the synchronous converter and to perform power factor correction.

9. The bidirectional AC power converter according to claim 8, wherein the automated controller is configured to sequence a startup of the bidirectional AC power converter different from a normal operating sequence.

10. The bidirectional AC power converter according to claim 8, wherein the nine-switch front-end is controlled to balance a phase load on the three phase AC system.

11. The bidirectional AC power converter according to claim 8, wherein a load on the secondary system comprises a battery, and the bidirectional AC power converter is controlled to charge the battery from the three phase AC system in a first mode of operation, and is controlled to power the three phase AC system from the battery in a second mode of operation.

12. The bidirectional AC power converter according to claim 8, wherein the synchronous converter is controlled by the automated controller to produce a dynamic waveform distinct from a waveform of the bidirectionally coupled AC electrical power at the switching frequency.

13. The bidirectional AC power converter according to claim 1, wherein the magnetizing inductance ($L_m$) of the coupling transformer, and the tank circuit are together configured to maintain zero voltage switching (ZVS) of at least six switches of the nine-switch front end over a range of load conditions comprising a factor of two.

14. The bidirectional AC power converter according to claim 1, further comprising:
    a capacitor across the DC potential; and
    an automated controller, configured to control the nine-switch front end in a startup mode to:
    charge the capacitor with a desired DC potential in a rectifier mode of operation; and
    after charging the capacitor, initiate operation of the tank circuits by switching at a switching frequency of about double the resonant frequency, and subsequently reduce the frequency of operation until a desired output is achieved at the secondary load.

15. The bidirectional AC power converter according to claim 1, further comprising an automated controller, configured to selectively control the nine-switch front end in a low-power mode below a threshold portion of rated output, to transfer the coupled AC electrical power through the set of three tank circuits in a burst mode of operation wherein the switches are alternately turned on and off for intervals of several switching cycles.

16. The bidirectional AC power converter according to claim 1, further comprising an automated controller configured to regulate output power of the secondary system by phase shift control of the nine-switch front-end and the synchronous converter.

17. A power converter, comprising:
    a front-end interfacing with a multi-phase AC system, comprising, for each respective phase, a set of three switches in series;
    a capacitor in parallel with each of the sets of three switches in series;
    a resonant tank circuit for each respective phase, connected between two of the set of three switches in series for a respective phase;
    a synchronous converter, configured to interface with a secondary power system; and
    a coupling transformer, configured to couple power from the resonant tank circuit for each respective phase to the synchronous converter.

18. The power converter according to claim 17, further comprising an automated control, configured to:
    control the front-end to synchronously convert electrical power between the multi-phase AC system and a DC potential on the capacitor, and
    convert the DC potential on the capacitor into a switched frequency which passes through the resonant tank circuits,
    such that two of the set of three switches are soft-switched and one of set of three switches is semi-soft switched.

19. The power converter according to claim 18, further comprising:
    an automated controller, configured to control the sets of three switches in series in a startup mode to:
    charge the capacitor with a desired DC voltage in a rectifier mode of operation; and
    after charging the capacitor, initiate operation of the resonant tank circuits by switching at a switching frequency of about double a resonant frequency, and subsequently reduce the frequency of operation until a desired output is achieved at the secondary load.

20. A method of power conversion, comprising:
    providing a power converter, comprising a front-end interfacing with a multi-phase AC system, comprising, for each respective phase, a set of three switches in series, a capacitor in parallel with each of the sets of three switches in series, a resonant tank circuit for each respective phase, connected between two of the set of three switches in series for a respective phase, a synchronous converter, configured to interface with a secondary power system, and a coupling transformer, configured to couple power from the resonant tank circuit for each respective phase to the synchronous converter; and
    automatically controlling the set of three switches in series and the synchronous converter, to control the front-end to synchronously convert electrical power between the multi-phase AC system and a DC potential on the capacitor, and convert the DC potential on the capacitor into a switched frequency which passes through the resonant tank circuits.

* * * * *